No. 748,944. Patented January 5, 1904.

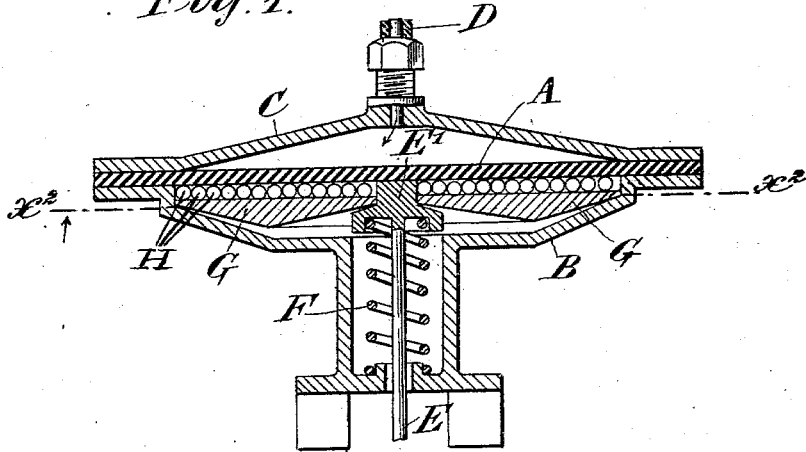
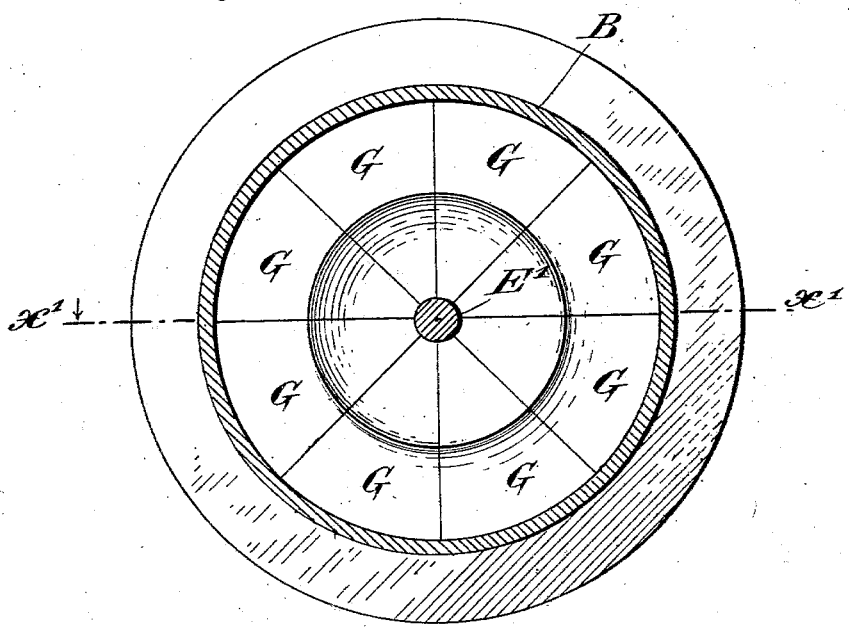

UNITED STATES PATENT OFFICE.

JULES GROUVELLE AND HENRI ARQUEMBOURG, OF PARIS, FRANCE.

DIAPHRAGM INDICATING, CONTROLLING, AND MEASURING APPLIANCE.

SPECIFICATION forming part of Letters Patent No. 748,944, dated January 5, 1904.

Application filed December 4, 1901. Serial No. 84,604. (No model.)

*To all whom it may concern:*

Be it known that we, JULES GROUVELLE and HENRI ARQUEMBOURG, citizens of the French Republic, residing at 71 Rue de Moulin-Vert, Paris, France, have jointly invented certain new and useful Improvements in Diaphragm Devices, of which the following is a specification.

This invention relates to the class of diaphragm devices for indicating, controlling, and measuring mechanisms; and our invention resides in an improved armor or reinforcing construction for the flexing membrane of the diaphragm, which will be hereinafter particularly described. It is well known that in such mechanisms diaphragms of metal and similar materials can be operated under high pressures; but they are only suitable for uses where a moderate flexure of the diaphragm is required. On the other hand, it is equally well known that in such mechanisms diaphragms of india-rubber and the like can be flexed to a much greater extent, but that these are only adapted for uses where moderate or low pressures are employed. With diaphragms of either class noted above if the conditions recited are departed from the diaphragms suffer permanent deformation and become useless. To overcome the objections stated above and to provide a diaphragm which can be operated under heavy pressures and shall have also a sufficient amount of flexure for all practical purposes without undue deformation is the object of the present invention.

In the accompanying drawings, which serve to illustrate several embodiments of the invention, Figure 1 is a transverse axial section of the device at line $x'$ in Fig. 2; and Fig. 2 is a horizontal section taken at line $x^2$ in Fig. 1, showing the under side with the reinforcing devices.

A is the rubber membrane of the diaphragm, clamped at its outer margin between the flanges of the casing, this latter comprising the main section or body B and the cover C. A pipe D admits a fluid under pressure through the cover C to the diaphragm-chamber above the diaphragm. An operating-rod E in contact with the lower face of the diaphragm extends out below and may be employed to impart motion to any indicating, controlling, or measuring apparatus. This rod has a head E' at its upper end, and the pressure of the fluid on the upper face of the diaphragm is antagonized and resisted to some extent by a spring F under said head.

Under the rubber membrane A is disposed the reinforce of the diaphragm, which is composed of a number of independently-movable sectors G, of metal, which rest at their outer ends on the body B and at their inner ends on the head E'. In filling in the sectors G only a little space or play must be allowed, as such space or play between the radial margins of the said sectors increases with the flexure in either direction above or below the normal horizontal position seen in Fig. 1. Between the upper faces of the sectors and the lower face of the rubber diaphragm-membrane are inserted a plurality of balls H. These balls serve to reduce the chafing and friction incident to such constructions under pressure.

The operation of the device will be obvious to any one skilled in the art. The rubber A provides against leakage and yields readily to pressure. The reinforcing-sectors impart strength and permit of heavy pressures being employed, and the interposed balls prevent chafing and friction between the reinforcing-sectors and the rubber membrane when the diaphragm is under pressure.

The words "upper" and "lower" used in describing the relative positions of the parts shown in the drawings must be taken merely as descriptive.

Obviously the device may be inverted without in any degree interfering with its proper operation.

Having thus described our invention, we claim—

1. In a diaphragm device, a diaphragm comprising a membrane of flexible material, a reinforce therefor having a plurality of radially-disposed and independently-movable sectors of rigid material, and balls disposed between the said membrane and reinforce.

2. A diaphragm device comprising a casing consisting of a body B, and a cover C, the latter having an inlet for a fluid under pressure, a rubber membrane A, clamped between the margins of the said body and cover, the reinforce consisting of the segments G, under said membrane, the balls H between said membrane and segments, the rod E, having a head which bears on the under side of the said membrane, and the spring F under said head, substantially as set forth.

In testimony whereof we have signed our names to this specification in the presence of two subscribing witnesses.

JULES GROUVELLE.
HENRI ARQUEMBOURG.

Witnesses:
EDOUARD CARÉNON,
GABRIEL THAREAM.